United States Patent
Ireland

(10) Patent No.: US 8,843,438 B2
(45) Date of Patent: Sep. 23, 2014

(54) PARAMETER VALUE BINDING FOR MOBILE BUSINESS OBJECTS

(76) Inventor: Evan Ireland, Wellington (NZ)

(*) Notice: Subject to any disclaimer, the term of this patent is extended or adjusted under 35 U.S.C. 154(b) by 625 days.

(21) Appl. No.: 12/840,239

(22) Filed: Jul. 20, 2010

(65) Prior Publication Data
US 2012/0023064 A1 Jan. 26, 2012

(51) Int. Cl.
G06F 7/00 (2006.01)
H04W 4/00 (2009.01)
H04L 29/08 (2006.01)

(52) U.S. Cl.
CPC .............. H04L 67/1095 (2013.01); H04W 4/003 (2013.01)
USPC ........................................... 707/610

(58) Field of Classification Search
CPC ................ G06F 11/1658; G06F 11/2082
USPC ............. 707/610, 616, 755, 999.101
See application file for complete search history.

(56) References Cited

U.S. PATENT DOCUMENTS

| | | | |
|---|---|---|---|
| 6,970,902 B1* | 11/2005 | Moon | 709/201 |
| 2002/0016814 A1* | 2/2002 | Convent et al. | 709/203 |
| 2003/0065826 A1 | 4/2003 | Skufca et al. | |
| 2005/0005259 A1 | 1/2005 | Avery et al. | |
| 2005/0289457 A1* | 12/2005 | Obasanjo et al. | 715/513 |
| 2006/0112398 A1* | 5/2006 | Mukkamala et al. | 719/316 |
| 2007/0143358 A1* | 6/2007 | Sasaki et al. | 707/201 |
| 2007/0180125 A1* | 8/2007 | Knowles et al. | 709/227 |
| 2007/0260475 A1 | 11/2007 | Bhanote | |
| 2007/0275745 A1* | 11/2007 | Owen | 455/502 |
| 2009/0150384 A1* | 6/2009 | Kruger et al. | 707/5 |
| 2009/0210631 A1* | 8/2009 | Bosworth et al. | 711/141 |
| 2009/0247134 A1* | 10/2009 | Jeide et al. | 455/414.2 |
| 2009/0282125 A1* | 11/2009 | Jeide et al. | 709/217 |
| 2009/0300656 A1* | 12/2009 | Bosworth et al. | 719/320 |
| 2010/0030783 A1 | 2/2010 | Ho et al. | |
| 2010/0269098 A1* | 10/2010 | DeBruin et al. | 717/114 |

OTHER PUBLICATIONS

International Search Report by the International Searching Authority for International Application No. PCT/US2011/043833, Korean Intellectual Property Office, Republic of Korea, mailed on Feb. 27, 2012.

* cited by examiner

Primary Examiner — Mohammed R Uddin
(74) Attorney, Agent, or Firm — Sterne, Kessler, Goldstein & Fox PLLC

(57) ABSTRACT

A system, method, and computer program product are provided for facilitating interaction between front-end mobile business objects and back-end enterprise information system data. The approaches described reduce the need for client-visible parameters needed by the enterprise information system, but that can be handled without being directly supplied by a developed of a client application on a mobile device interacting with the enterprise information system via a synchronization server.

16 Claims, 11 Drawing Sheets

| bind path | personalization parameter | constant value | value path |
|---|---|---|---|
| parameter<authInfo> | | | |
| parameter<authInfo>.username | username | | |
| parameter<authInfo>.password | password | | |
| parameter<custInfo> | | | |
| parameter<custInfo>.name | | | attribute<name> |
| parameter<custInfo>.phone | | | attribute<phone> |
| parameter<custInfo>.address | | | |
| parameter<custInfo>.address.street | | | attribute<address> |
| parameter<custInfo>.address.city | | | attribute<city> |
| parameter<custInfo>.address.state | | | attribute<state> |

| | bind path | personalization parameter | constant value | value path |
|---|---|---|---|---|
| 602 | parameter<authInfo> | | | |
| 604 | parameter<authInfo>.username | | albert | |
| 606 | parameter<authInfo>.password | | secret | |
| 608 | parameter<custInfo> | | | |
| 610 | parameter<custInfo>.name | | | attribute<name> |
| 612 | parameter<custInfo>.phone | | | attribute<phone> |
| 614 | parameter<custInfo>.address | | | |
| 616 | parameter<custInfo>.address.street | | | attribute<address> |
| 618 | parameter<custInfo>.address.city | | | attribute<city> |
| 620 | parameter<custInfo>.address.state | | | attribute<state> |

| bind path | personalization parameter | constant value | value path |
|---|---|---|---|
| parameter<authInfo> | auth | {"username":"albert", "password":"secret"} | |
| parameter<authInfo>.username | | | |
| parameter<authInfo>.password | | | |
| parameter<custInfo> | | | |
| parameter<custInfo>.name | | | attribute<name> |
| parameter<custInfo>.phone | | | attribute<phone> |
| parameter<custInfo>.address | | | |
| parameter<custInfo>.address.street | | | attribute<address> |
| parameter<custInfo>.address.city | | | attribute<city> |
| parameter<custInfo>.address.state | | | attribute<state> |

| bind path | EIS data type | constant value | value path |
|---|---|---|---|
| parameter<authInfo> | AUTH_INFO | | |
| parameter<authInfo>.username | string | albert | |
| parameter<authInfo>.password | string | secret | |
| parameter<orderHeader> | ORDER_HEADER | | |
| parameter<orderHeader>.cid | string | | attribute<customerId> |
| parameter<orderLine> | ORDER_LINE* | | |
| parameter<orderLine>[] | ORDER_LINE | | |
| parameter<orderLine>[].qty | int | | attribute<orderLines>[].quantity |
| parameter<orderLine>[].pid | string | | attribute<orderLines>[].productId |

| bind path | EIS data type | constant value | value path |
|---|---|---|---|
| parameter<authInfo> | AUTH_INFO | | |
| parameter<authInfo>.username | string | albert | |
| parameter<authInfo>.password | string | secret | |
| parameter<orderHeader> | ORDER_HEADER | | |
| parameter<orderHeader>.cid | string | | attribute<customerId> |
| parameter<productIds> | string* | | |
| parameter<productIds>[] | int | | attribute<orderLines>[].productId |

FIG. 9

| bind path | personalization parameter | constant value | synchronization parameter |
|---|---|---|---|
| parameter<authInfo> | | | |
| parameter<authInfo>.username | | albert | |
| parameter<authInfo>.password | | secret | |
| parameter<searchBy> | | | |
| parameter<searchBy>.state | | | state |

PARAMETER VALUE BINDING FOR MOBILE BUSINESS OBJECTS

BACKGROUND OF INVENTION

1. Field of the Invention

The present invention relates generally to database synchronization, and, more specifically, to programming abstractions used in database synchronization.

2. Description of the Background Art

Synchronization servers are used to allow mobile devices to occasionally synchronize data between a device-local database and an enterprise information system ("EIS"). The synchronization server acts as an intermediary, facilitating this transaction.

The synchronization server maintains a cache database with a copy of selected data from the EIS, corresponding to mobile business object ("MBO") classes used by an application on a mobile device. However, a challenge exists in integrating an EIS without requiring a mobile device application developer to target the requirements of a particular EIS.

Accordingly, what is desired are improved methods of abstraction for communications between MBOs and a backing EIS.

SUMMARY OF INVENTION

Embodiments of the invention include a method comprising obtaining a specification for an enterprise information system operation comprising one or more parameters, identifying a mobile business object related to the enterprise information system operation, and defining a binding for the one or more parameters.

Embodiments of the invention additionally include an article of manufacture including a computer-readable storage medium having stored thereon computer-executable instructions, execution of which, by one or more computing devices, causes the computing devices to perform operations comprising obtaining a specification for an enterprise information system operation comprising one or more parameters, identifying a mobile business object related to the enterprise information system operation, and defining a binding for the one or more parameters.

Embodiments of the invention further include a system comprising a memory configured to store modules comprising an obtaining module configured to obtain a specification for an enterprise information system operation comprising one or more parameters, an identifying module configured to identify a mobile business object related to the enterprise information system operation, and a defining module configured to define a binding for the one or more parameters, and one or more processors configured to process the modules.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings, which are incorporated herein and form a part of the specification, illustrate embodiments of the present invention and, together with the description, further serve to explain the principles of the invention and to enable a person skilled in the relevant art to make and use the invention.

FIG. 5 is a bind path grid illustrating the concept of value binding, in accordance with an embodiment of the present invention.

FIG. 6 is a bind path grid illustrating the concept of value binding using constant values, in accordance with an embodiment of the present invention.

FIG. 7 is a bind path grid illustrating the concept of value binding using complex personalization parameters, in accordance with an embodiment of the present invention.

FIG. 8 is a bind path grid illustrating the concept of related entities binding, in accordance with an embodiment of the present invention.

FIG. 9 is a bind path grid illustrating related entities binding using a single item per order line in the enterprise information system expected XML document, in accordance with an embodiment of the present invention.

FIG. 10 is a bind path grid illustrating the use of synchronization parameters, in accordance with an embodiment of the present invention.

Figure 1:
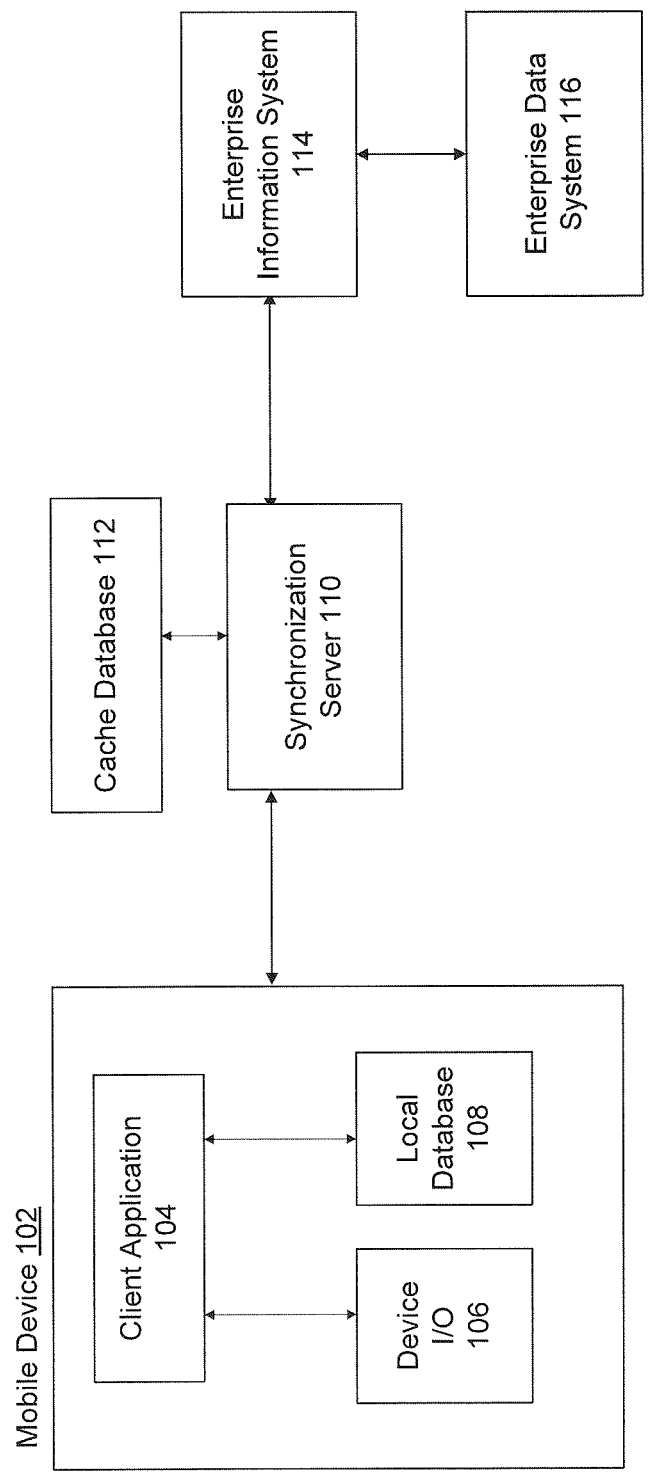
FIG. 1 is an exemplary enterprise network, in accordance with an embodiment of the present invention.

The present invention will now be described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

I. Introduction

The following detailed description of the present invention refers to the accompanying drawings that illustrate exemplary embodiments consistent with this invention. Other embodiments are possible, and modifications can be made to the embodiments within the spirit and scope of the invention. Therefore, the detailed description is not meant to limit the invention. Rather, the scope of the invention is defined by the appended claims.

It would be apparent to one of skill in the art that the present invention, as described below, can be implemented in many different embodiments of software, hardware, firmware, and/or the entities illustrated in the figures. Any actual software code with the specialized control of hardware to implement the present invention is not limiting of the present invention. Thus, the operational behavior of the present invention will be described with the understanding that modifications and variations of the embodiments are possible, and within the scope and spirit of the present invention.

Reference to modules in this specification and the claims means any combination of hardware or software components for performing the indicated function. A module need not be a rigidly defined entity, such that several modules may overlap hardware and software components in functionality. For example, a software module may refer to a single line of code within a procedure, the procedure itself being a separate software module. One skilled in the relevant arts will understand that the functionality of modules may be defined in accordance with a number of stylistic or performance-optimizing techniques, for example.

FIG. 1 is an exemplary enterprise network 100, in accordance with an embodiment of the present invention. The enterprise network 100 includes a mobile device 102, in accordance with a further embodiment of the present invention. Mobile device 102 may include, by way of example and not limitation, mobile devices such as the BLACKBERRY by RESEARCH IN MOTION of Waterloo, Ontario, Canada or the APPLE IPHONE by APPLE COMPUTER, INC. of Cupertino, Calif. One skilled in the relevant arts will recognize that techniques described herein as applicable to mobile device 102 may also generally be applied to non-mobile devices as well, such as, for example, a personal computer.

In accordance with an embodiment of the present invention, mobile device 102 has a client application 104 installed thereon. Client application 104 is able to interface with device inputs and outputs ("I/O") 106, such as, for example, a monitor, keypad, or touchscreen display, in accordance with an embodiment of the present invention. Client application 104 is also able to interface with a local database 108, which stores a set of data intended for use by client application 104.

Mobile device 102 is in communication with synchronization server 110, in accordance with an embodiment of the present invention. Additional mobile devices, such as mobile device 102, may similarly be in communication with synchronization server 110, in accordance with a further embodiment of the present invention. The various mobile devices can be connected to synchronization server 110 via any one or more communications channels, as would be understood by one skilled in the relevant art. For example, connectivity between mobile device 102 and synchronization server 110 may involve, in an exemplary embodiment, communication hops over both a cellular communication network and the Internet. The various communication hops may themselves be either public or private networks, and may include components located on the Internet as well as various private intranets.

Synchronization server 110 sits between the one or more mobile devices 102 and an Enterprise Information System ("EIS") 114, in accordance with an embodiment of the present invention. Synchronization server 110 assists in capturing changes to relevant data made by the EIS 114 and providing the changes to mobile devices 102. Synchronization server 110 also assists in capturing changes made by the mobile devices 102 and providing the changes to EIS 114. In this manner, data available to a mobile device 102 in local database 108 can be synchronized with data from the corresponding data store of EIS 114, the enterprise data system 116. In accordance with an embodiment of the present invention, synchronization server 110 maintains a cache database 112 reflecting the data from enterprise data system 116.

EIS 114 is connected to synchronization server 110 in order to allow synchronization server 110 to provide the aforementioned data synchronization services, in accordance with an embodiment of the present invention. Communications between EIS 114 and synchronization server 110 can likewise be through any communication channels, as would be understood by one skilled in the relevant art. One skilled in the relevant arts will further understand that EIS 114 and synchronization server 110 may share a same physical server or distributed server as separate software components therein, or may even be compiled as a single combined application. Therefore, it is understood that synchronization server 110 and EIS 114 may be disposed in a number of different locations within enterprise network 100, and are shown as separate computing devices in FIG. 1 by way of example, and not limitation.

As previously noted, EIS 114 further includes, or is otherwise communicatively coupled to, an enterprise system 116, in accordance with an embodiment of the present invention. In accordance with a further embodiment of the present invention, data within local database 108 comprises a subset of data from enterprise data system 116. This data may be in for the form of a mobile business object ("MBO"), in accordance with an embodiment of the present invention. An MBO is a business object that can be synchronized between enterprise information system 114 and mobile device 102. The MBO can be persisted, by storage in local database 108, in order to allow for access by the mobile device 102 during periods without connectivity to EIS 114. Additionally, cache database 112 is comprised of database tables that correspond to MBOs. A non-limiting example of MBOs is provided in U.S. patent application Ser. No. 12/503,573, filed on Jul. 15, 2009, entitled "Metadata Driven Mobile Business Objects," which is incorporated by reference herein in its entirety.

Additional functionality of synchronization server 110, EIS 114, and interactions with MBOs is described, inter alia, by co-pending U.S. patent application Ser. No. 12/839,843, filed on Jul. 20, 2010 and entitled "Membership Tracking and Data Eviction in Mobile Middleware Scenarios", by co-pending U.S. patent application Ser. No. 12/813,104, filed on Jun. 10, 2010 and entitled "Message Based Synchronization for Mobile Business Objects", by co-pending U.S. patent application Ser. No. 12/649,527, filed on Dec. 30, 2009 and entitled "Message Based Mobile Object with Native PIM Integration", and to co-pending U.S. patent application Ser. No. 12/797,975, filed on Jun. 10, 2010 and entitled "Pending State Management for Mobile Business Objects", all of which are incorporated herein by reference in their entireties II. Enterprise Information System Operation EIS 114 provides data from enterprise data system 116, in accordance with an embodiment of the present invention. Data is accessible from EIS 114 by a defined set of operations, in accordance with a further embodiment of the present invention. By way of a non-limiting exemplary embodiment, EIS operations are presented as web services that expect an XML element with nested structures specifying the EIS operation and zero or more named parameters.

In accordance with an embodiment of the present invention, in an EIS operation having named parameters, each named parameter has a specified EIS data type, which may include a primitive type (e.g., date, string, integer), a primitive list type (e.g., date* (where the "*" suffix denotes a list)), a structure type (e.g. MyStructure) containing a set of named fields themselves having EIS data types, and a structure list type (e.g., MyStructure*).

By way of a non-limiting example, an EIS operation used to create a new customer can be specified by an XML element as follows:

```
<createCustomer>
    <authInfo>
```

```
        <username>albert</username>
        <password>secret</password>
    </authInfo>
    <custInfo>
        <name>Griffins</name>
        <phone>(555)123-4567</phone>
        <address>
            <street>123 Four St</street>
            <city>Dublin</city>
            <state>CA</state>
        </address>
    </custInfo>
</createCustomer>
```

One skilled in the relevant arts will recognize that other techniques for specifying an EIS operation may be used, and those discussed herein are provided by way of example, and not limitation. Additionally, the XML example shown above may include overhead for other data to be communicated, including, but not limited to, SOAP overhead, in accordance with an embodiment of the present invention.

In the above non-limiting example, the information contained within the "authInfo" tags (e.g., a username and a password) is used to authenticate a requestor sending the XML data to the EIS 114. If this authentication data matches expected values in EIS 114, then EIS 114 permits the creation of a customer using the data specified within the "custInfo" tags. One skilled in the relevant arts will recognize that other operations may be specified, including other forms for specifying a create customer operation.

Using the above non-limiting exemplary XML EIS operation format, it is noted that the authInfo data must be included with every request to create a new customer record. The manner in which this data is obtained for populating this XML document used to call the EIS operation, including authentication data by way of non-limiting example, is described in further detail herein.

III. Mobile Business Object Operation

As previously described, MBOs are used at the client application 104 and cache database 112 to represent data from enterprise data system 116, in accordance with an embodiment of the present invention. MBOs are defined in packages, each package containing the definition for one or more MBOs, in accordance with a further embodiment of the present invention. The definition of an MBO is comprised of a set of attributes (akin to structure fields) and a set of operations that may be called by client application 104, in accordance with an embodiment of the present invention.

The definition of an MBO, with its corresponding set of attributes and operations, may be provided through the use of a visual modeling tool, in accordance with an embodiment of the present invention. By way of a non-limiting exemplary embodiment, the visual modeling tool may be Eclipse from THE ECLIPSE FOUNDATION of Ottawa, Ontario, Canada running UML modeling tools.

In a previous example, an EIS operation for creating a new customer in the back-end of enterprise data system 116 via EIS 114 was described. A customer can be described at the front-end (e.g., client application 104 or cache database 112) using an MBO. In accordance with an embodiment of the present invention, a package comprising an MBO is represented in XML. In a non-limiting example, an XML representation of a package comprising a customer MBO follows:

```
<package name="my.package">
    <database-class name="MyDatabase" />
    <entity name="Customer" key="id">
        <attribute name="id" type="string" />
        <attribute name="name" type="string" />
        <attribute name="phone" type="string" />
        <attribute name="address" type="string" />
        <attribute name="city" type="string" />
        <attribute name="state" type="string" />
        <operation name="create">
            ...
        </operation>
        <operation name="update">
            ...
        </operation>
        <operation name="delete">
            ...
        </operation>
    </entity>
</package>
```

In the above example, an ellipsis (" . . . ") denotes a segment of the XML document has been deliberately left out. For example, the specifics of the "create", "update", and "delete" operations is not shown, although one skilled in the relevant arts will understand that a number of ways of defining these operations may be employed. Additionally, the particular XML syntax employed is provided by way of example, and not limitation.

Using the above XML definition, MBO classes can be generated by an MBO code generator, in accordance with an embodiment of the present invention. These MBO classes can then be referenced by a developer of client application 104. For example, an MBO code generator can use the above XML definition to generate a customer class that can be utilized as follows:

```
Customer c = new Customer( );
c.setName("Griffins");
c.setPhone("(555)123-4567");
c.setAddress("123 Four St");
c.setCity("Dublin");
c.setState("CA");
c.create( );
```

Preferably, a developer of client application 104 would then be able to upload a newly-created customer, such as the customer stored in the Customer "c" object above, to the EIS 114. In accordance with an embodiment of the present invention, a client application 104 developer could use syntax such as the following to synchronize the newly-created client with EIS 114:

```
c.submitPending( );
MyDatabase.synchronize( );
```

Figure 2:
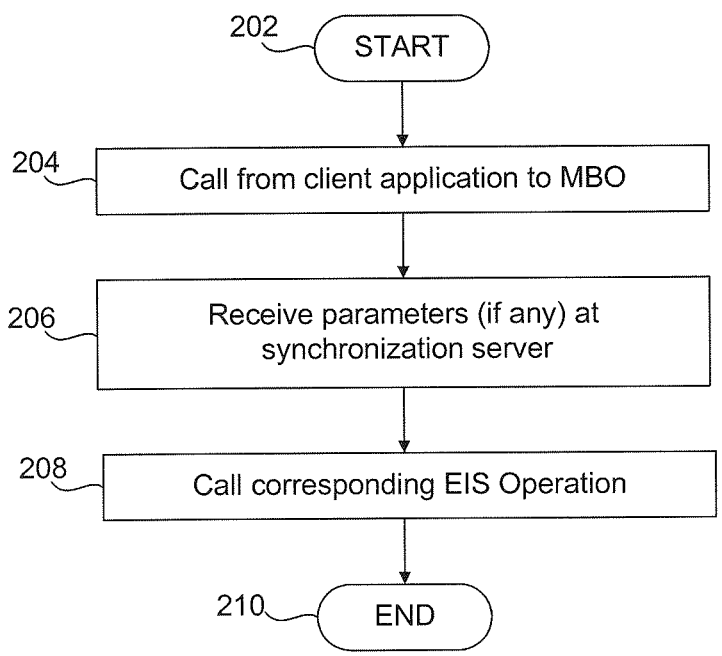
FIG. 2 is a flowchart illustrating a method by which a client application is able to call into an enterprise information system using a mobile business object, in accordance with an embodiment of the present invention.

However, a challenge exists in obtaining the data from the MBO class and passing it to the EIS 114 in the format expected by EIS 114 and with any named parameters expected by EIS 114. FIG. 2 is a flowchart 200 illustrating a method by which a client application 104 is able to call into EIS 114 using an MBO, in accordance with an embodiment of the present invention. The method begins at step 202 and proceeds to step 204 where a client application 104 makes a call to an MBO, such as through the non-limiting exemplary "c.submitPending( )" and "MyDatabase.synchronize( );" calls shown above, in accordance with an embodiment of the present invention.

The method then proceeds to step 206, where the synchronization server 110 receives the call, including any parameters (e.g., a customer's name, phone, address, etc.) for synchronization with EIS 114. At step 208, synchronization server 110 calls a corresponding EIS 114 operation using the data received from the MBO. In accordance with a non-limiting exemplary embodiment, synchronization server 110 could utilize the data from the Customer MBO class in order to create and populate a "createClass" EIS 114 XML element, using the example shown in Section II, supra. The method then ends at step 210.

IV. Complex-Typed Mobile Business Object Solution

As noted above, synchronization server 110 serves the function of receiving any MBO parameters at step 206 of FIG. 2, and calling the corresponding EIS operation at step 208. This involves passing the necessary data to the EIS 114 as required by the EIS operation's definition.

Notably, in the above non-limiting example of Section III, the "c.create( )" operation used to create a new customer (using, e.g., code-generated functionality based on the XML representation of the MBO) has no parameters, whereas the EIS 114 "createCustomer" operation described in Section II has complex parameters. In one solution, the complex parameters of the "createCustomer" operation, or other EIS operation, can be directly exposed to a developer of client application 104 by modeling a corresponding MBO to have complex-typed parameters. This naïve implementation requires a lot of extra effort by a client application 104 developer in order to work.

For example, the remodeled MBO for a Customer may instead read (with some portions omitted using ellipses for clarity):

```
<package name="my.package">
    ...
    <class name="AuthInfo">
        <attribute name="username" type="string" />
        <attribute name="password" type="string" />
    </class>
    <class name="AddrInfo">
        <attribute name="street" type="string" />
        <attribute name="city" type="string" />
        <attribute name="state" type="string" />
    </class>
    <class name="CustInfo">
        <attribute name="id" type="string" />
        <attribute name="name" type="string" />
        <attribute name="phone" type="string" />
        <attribute name="address" type="AddrInfo" />
    </class>
    <entity name="Customer" ...>
        ...
        <operation name="create">
            <parameter name="authInfo" type="AuthInfo" />
            <parameter name="custInfo" type="CustInfo" />
        </operation>
    </entity>
    ...
</package>
```

In this remodeled MBO, there is a one-to-one correspondence between MBO attributes and parameters, and the EIS 114 parameters for the "createCustomer" operation, by way of a non-limiting example. However, in many instances, this degree of visibility of EIS 114 parameters is neither necessary nor desirable to a developer of client application 104. For example, a different data structure for storing customer info may be more useful to the client application 104 developer, or it may be desirable to hide the particularities of authentication.

The resulting code necessary to utilize this MBO, having a one-to-one correspondence between MBO operation parameters and EIS 114 operation parameters, could be as follows:

```
AuthInfo authInfo = new AuthInfo( );
authInfo.setUsername("albert");
authInfo.setPassword("secret");
AddrInfo addrInfo = new AddrInfo( );
addrInfo.setStreet("123 Four St");
addrInfo.setCity("Dublin");
addrInfo.setState("SA");
CustInfo custInfo = new CustInfo( );
custInfo.setName("Griffins");
custInfo.setAddress(addrInfo);
Customer c = new Customer( );
c.create(authInfo, custInfo);
```

This approach requires significantly more knowledge of the EIS 114 operation than is desirable to a developer of client application 104. Contrasted with the relative ease of utilizing the customer creation example of Section III, a developer of client application 104 using this one-to-one MBO-to-EIS 114 operation parameter correspondence must provide more information in perhaps a more complex manner.

Regardless of the motives, it is useful to provide logic at synchronization server 110 to satisfy EIS 114 operation parameter requirements without requiring a user of a corresponding MBO, such as a developer of client application 104, from specifying all of the EIS 114 operation parameters directly. As a result, this implementation of the MBO requires too much of a developer of client application 104.

V. Matching Mobile Business Object Parameters and Attributes to Enterprise Information System Parameters Instead of requiring client application 104 to directly provide all of the information requested by an EIS 114 operation, in the same format required by EIS 114, an MBO can be defined in a way that the requirements of the EIS 114 operation can be satisfied without requiring a user of the MBO to specify all of the required data, in accordance with an embodiment of the present invention. This is accomplished by initially depicting information required in an EIS 114 operation in a bind path, in accordance with an embodiment of the present invention.

Figure 3:
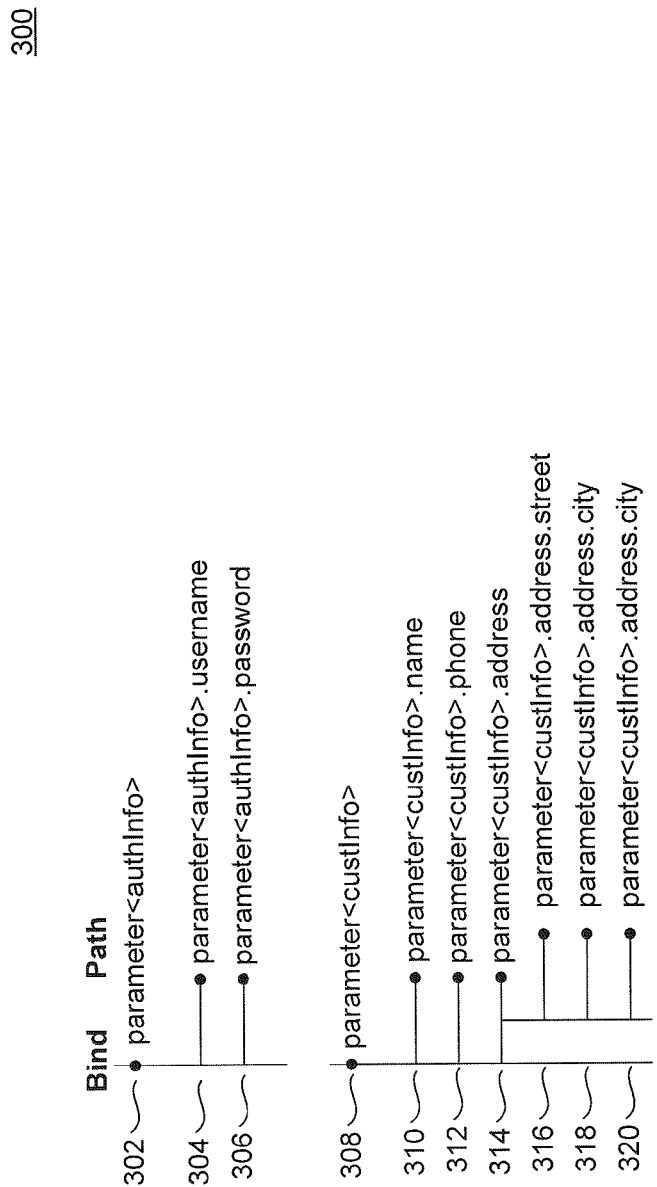
FIG. 3 is a visualization of an enterprise information system bind path, in accordance with an embodiment of the present invention.

FIG. 3 is a visualization of an EIS 114 bind path 300, in accordance with an embodiment of the present invention. A bind path can be depicted in a tree structure, as shown in FIG. 3, or in a grid as will be shown subsequently, although one skilled in the relevant arts will appreciate that other depictions may be utilized, or may not be visible at all. A visualization of bind path 300 is used to extend a visual modeling tool for developing an MBO to allow the specification of EIS operation parameters.

In accordance with a non-limiting exemplary embodiment, bind path 300 shows the required authInfo and custInfo parameters 302 and 308 for the createCustomer operation of EIS 114. Additional parameters below these authInfo and custInfo parameters 302 and 308 depict the parameters of which they are comprised, such as username and password parameters 304 and 306 in the authInfo parameter, and name, phone, and address parameters 310, 312, and 314 in the custInfo parameter. Similarly, the custInfo.address parameter has corresponding street, city, and state parameters 316, 318, and 320.

The parameters shown in bind path 300 are those that need to be specified to satisfy an EIS 114 operation, in this case the createCustomer operation, in accordance with an embodiment of the present invention. One skilled in the relevant arts will appreciate that any number of EIS 114 operations can be modeled in this manner, and is not limited to exemplary EIS 114 operations accepting an XML document as an input.

Figure 4:
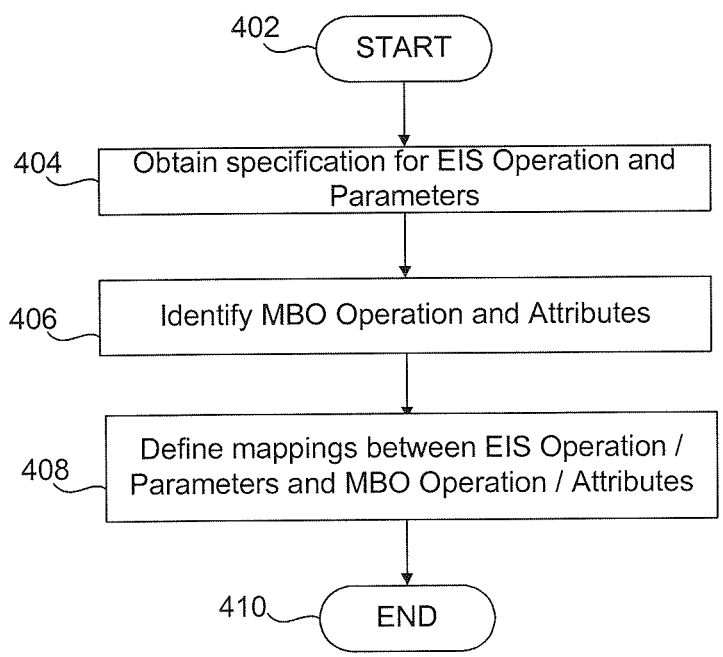
FIG. 4 is a flowchart illustrating a method for binding to enterprise information system operation parameters, in accordance with an embodiment of the present invention.

FIG. 4 is a flowchart 400 illustrating a method for binding to EIS 114 operation parameters, in accordance with an embodiment of the present invention. The method begins at step 402 and proceeds to step 404 where a specification of an EIS 114 operation and its parameters, if any, is obtained, in accordance with an embodiment of the present invention. At step 406, a corresponding MBO operation and its attributes are identified.

Then, at step 408, mappings between the EIS 114 operation and its parameters and the MBO operation and its attributes are specified, in accordance with an embodiment of the present invention. In accordance with a further embodiment of the present invention, EIS 114 operation parameters are specified by other methods than mapping to MBO attributes, which will be described further herein. The method then ends at step 410.

VI. Value Binding

One manner in which synchronization server 110 can specify data for an EIS 114 operation is through the use of value binding, in accordance with an embodiment of the present invention. FIG. 5 is a bind path grid 500 illustrating the concept of value binding, in accordance with an embodiment of the present invention. Bind path grid 500 corresponds to bind path 300, depicted as a tree structure for visual reference (e.g., in a visual modeling tool).

An MBO developer can specify, for a particular bind path in bind path grid 500, a value path used for value binding the particular bind path, in accordance with an embodiment of the present invention. In a non-limiting exemplary embodiment as shown in bind path grid 500, the bind path "parameter<custInfo>.name" of row 510 is value bound to value path "attribute<name>". In this non-limiting example, the "name" attribute of an MBO class is used as the source for a value passed to EIS 114 as the parameter custInfo.name. A similar operation is shown, again by way of non-limiting example, at rows 512, 516, 518, and 520 of bind path grid 500.

The value path is used to associate the EIS operation parameter, such as "parameter<custInfo>.name" with a client-visible bind path (e.g., a bind path visible to client application 104), in accordance with an embodiment of the present invention.

As also shown in FIG. 5, value binding can also be made to a personalization parameter, as in rows 504 and 506, in accordance with an embodiment of the present invention. In a non-limiting exemplary embodiment, an MBO may specify personalization parameters comprising a username and password that can be reused via value binding without the need for a developer of client application 104 to either know about or specify these parameters. For example, an MBO can be designed to include personalization parameters such as:

```
<personalization-parameter name="username" type="string" />
<personalization-parameter name="password" type="string" />
```

These personalization parameters, in this instance, can be set once and reused by any Customer MBO class object, in accordance with an embodiment of the present invention. In accordance with a further embodiment of the present invention, personalization parameters may be retrieved from local database 108 or from EIS 114. In a non-limiting example, a username and password may be set at client application 104 using code such as:

```
PersonalizationParameters pp =
    MyDatabase.getPersonalizationParameters( );
pp.setUsername("albert");
pp.setPassword("secret");
pp.save( );
```

An EIS 114 operation parameter can also be value bound to a constant value, in accordance with an embodiment of the present invention. FIG. 6 is a bind path grid 600 illustrating the concept of value binding using constant values, in accordance with an embodiment of the present invention.

As shown in rows 604 and 606, EIS 114 operation parameters "parameter<authInfo>.username" and "parameter<autInfo>.password" can be value bound to constant values "albert" and "secret", respectively, in an exemplary non-limiting embodiment. One skilled in the relevant arts will recognize that the constant value (as with the result of any other value binding) can be of a simple or complex type. With a complex type, in the non-limiting example, a constant value could instead be specified for "parameter<authInfo>" 602 directly, rather than the username and password of rows 704 and 706 individually.

For example, FIG. 7 is a bind path grid 700 illustrating the concept of value binding using complex personalization parameters, in accordance with an embodiment of the present invention. Whereas simple type bindings may be performed on primitive-type nodes (e.g., username and password strings of rows 704 and 706), complex type bindings may be bound to structure-typed nodes, in accordance with a further embodiment of the present invention. In a non-limiting example, a personalization parameter having a complex type may be defined as:

```
<package name="my.package">
    ...
    <personalization-parameter name="auth" type="AuthInfo" />
    ...
</package>
```

In this instance, the "auth" personalization parameter has a complex type "AuthInfo" which encompasses both username and password simple type parameters (i.e., strings). This "auth" personalization parameter can therefore be bound directly to the structure-typed node "parameter<authInfo>" of row 702.

Additional value bindings may include binding to an expression, in accordance with an embodiment of the present invention. By way of a non-limiting example, such an expression binding could be to a function "now( )" that returns a current date and time, potentially through the use of a complex type including both results (e.g., a dateTime data type). In accordance with a further embodiment of the present invention, the expression may be a complex expression, such as conditional expressions.

Another form of value binding may be to a foreign attribute, specifically an attribute associated with another MBO, in accordance with an embodiment of the present invention. By way of a non-limiting example, a "getCustomers" EIS 114 read operation may have a "state" parameter having a value that should be selected from all of the distinct values of a "code" attribute of a "State" MBO. In accordance with an embodiment of the present invention, foreign attributes are used in read operations, discussed subsequently in the context of synchronization events.

VII. Default Values and Client Visibility of Value Bindings

When a constant value is bound to a client-visible value binding, it becomes a default value, in accordance with an embodiment of the present invention. As shown in row 702 of FIG. 7, a complex type constant value is specified alongside a personalization parameter, "auth". Specifically, the constant value:

```
{"username":"albert","password":"secret"}
``` is used to provide a default username/password combination. This default combination is used if a null value is obtained from an explicit MBO operation parameter, in accordance with an embodiment of the present invention. In this non-limiting example, if a null value is obtained from the "auth" personalization parameter, the constant value is utilized instead.

Generally, it would be desirable to simply utilize the constant value, if available, and hide the parameter from client visibility. However, there are occasions where it may be necessary or expedient to use client-visible parameters, as will be understood by one skilled in the relevant arts. An EIS operation parameter, and therefore its value binding, is deemed client-visible if there is a corresponding MBO operation parameter that is available to be passed by client application 104 code, in accordance with an embodiment of the present invention.

VIII. Related Entities Binding

In an additional non-limiting example, two MBOs are defined by an MBO modeler: a SalesOrder MBO and a related OrderLine MBO. However, the EIS 114 may expect a composite operation that includes both sales orders and order lines in a single XML document, again by way of example and not limitation. Such an XML document expected by EIS 114 may have the form:

```
<createOrder>
  <authInfo>
    <username>albert</username>
    <password>secret</password>
  </authInfo>
  <orderHeader>
    <cid>123</cid>
  </orderHeader>
  <orderLine>
    <qty>1</qty>
    <pid>101</pid>
  </orderLine>
  <orderLine>
    <qty>2</qty>
    <pid>202</pid>
  </orderLine>
</createOrder>
```

Accordingly, in order to support a createOrder operation on the SalesOrder MBO, value paths are constructed that refer to attributes of the related OrderLine MBO, in accordance with an embodiment of the present invention. FIG. 8 is a bind path grid 800 illustrating the concept of related entities binding, in accordance with an embodiment of the present invention.

As shown in row 816, an order line quantity EIS operation parameter is obtained by reference to the related OrderLine MBO (via an orderLines attribute) using the syntax "attribute<orderLines>[ ].quantity". A similar result is shown at row 818 for a product ID.

FIG. 9 is a bind path grid 900 illustrating related entities binding using a single item per order line in the EIS 114 expected XML document, in accordance with an embodiment of the present invention. In this instance, there would be a one-to-one correspondence between product IDs needed by EIS 114, and those stored in the OrderLine MBO. As a result, it is possible to map "attribute<orderLines>[ ].productId" directly to the EIS 114 "parameter<productIds>[ ]" as both the MBO attribute and EIS parameter are primitive-list-typed, in accordance with an embodiment of the present invention.

IX. Synchronization Parameters and Read Operations

A mobile business object may specify zero or more synchronization parameters, in accordance with an embodiment of the present invention. Each synchronization parameter has a name and a primitive data type, in accordance with a further embodiment of the present invention. In an exemplary non-limiting embodiment, an MBO may define a subscription as follows:

```
<entity name="Customer" ...>
  ...
  <subscribe>
    <synchronization-parameter name="state" type="string" />
    <download-data>
      <sql>
        select c.* from Customer c where c.state = :state
      </sql>
    </download-data>
  </subscribe>
  ...
</entity>
```

Then, utilizing the MBO, the synchronization parameter can be specified by a developer of client application 104 to, for example, limit the downloaded data to a subset of what is present at cache database 112. Using the above MBO specification, a developer of client application 104 may specify, by way of non-limiting example:

```
CustomerSynchronizationParameters cp =
    Customer.getSynchronizationParameters( );
sp.setState("CA");
MyDatabase.synchronize( );
```

This code would result in only customers having a state of "CA" being downloaded from cache database 112 to the local database 108 of mobile device 102, in accordance with an embodiment of the present invention. FIG. 10 is a bind path grid 1000 illustrating the use of synchronization parameters, in accordance with an embodiment of the present invention. In a non-limiting example, EIS 114 provides an operation to read customers through a web service expecting to receive an XML element having the following structure:

```
<getCustomers>
    <authInfo>
        <username>albert</username>
        <password>secret</password>
    </authInfo>
    <searchBy>
        <state>CA</state>
    </searchBy>
</getCustomers>
```

As shown in row 1010, the state synchronization parameter can be mapped, using the bind path grid, to EIS operation parameter "parameter<searchBy>.state", in accordance with an embodiment of the present invention. It is possible for each client application 104, or perhaps even each mobile device 102 or user thereof to specify a value for the synchronization parameters. In this instance, only those states specified have associated entries downloaded to local database 108 of mobile device 102 from cache database 112.

X. Additional Usages of Client-Visible Parameters

As previously noted, it is desirable where possible to eliminate client-visible parameters. However, a number of situations have been identified where client-visible parameters have a particular use. These situations are described herein as non-limiting examples, and one skilled in the relevant arts will understand that additional exceptions exist.

One instance where client-visible parameters may be desirable is using a fill-from attribute if a fill-from child attribute were allowed. Additionally, opportunities for use of personalization keys may be present, but not yet implemented and instead a client application 104 developer continues to rely on client-visible parameters.

In another instance, data may be passed to EIS 114 but not available as MBO attributes, even though the data could be made available as an attribute. For example, an INSTALL_DATE parameter may be passed directly by client application 104, even though it could be handled as a non-client-visible parameter, in a manner useful for auditing.

Additionally, a developer of client application 104 wishing to rely on a default constant value where an attribute, personalization parameter, or other value has been mapped, may deliberately pass a null value to the attribute or personalization parameter, in accordance with an embodiment of the present invention. One skilled in the relevant arts will appreciate that other techniques are available to specify reliance on the default constant value, such as, for example, breaking the link between parameter and argument and deleting the parameter, as possible on an additional embodiment of the present invention.

In accordance with a further embodiment of the present invention, client application 104 may need to pass flags to the EIS 114 operation based on whether an attribute has changed. One skilled in the relevant arts will appreciate that such functionality can be implemented for automatic handling at synchronization server 110, but may also be handled through client-visible parameters.

In another example, client application 104 may pass a parameter that client application 104 has readily available to an EIS 114 operation in order to improve performance of EIS 114, or to avoid cross-instance backend calls.

As will be apparent to one skilled in the relevant arts, the aforementioned examples are non-limiting, and provide only a few situations where client-visible parameters are useful in the context of the methodologies described herein.

XI. Code Generator

In accordance with an embodiment of the present invention, a code generator is employed to take MBO definitions, including value bindings, and generate source code and runtime meta data for each EIS 114 operation, in accordance with an embodiment of the present invention. The generated code and runtime meta data work together to properly construct an input record, or a list of input records for a read operation, that contain the EIS 114 operation parameters in the correct format, in accordance with a further embodiment of the present invention.

This allows a developer performing MBO modeling, as well as the client application 104 developer, to avoid writing any code to obtain values from the EIS 114 operation parameters from various possible sources (e.g., constant values, expressions, personalization parameters, synchronization parameters, foreign attributes, MBO attributes, MBO operation parameters, etc.).

XII. Example Computer System Implementation

Figure 11:
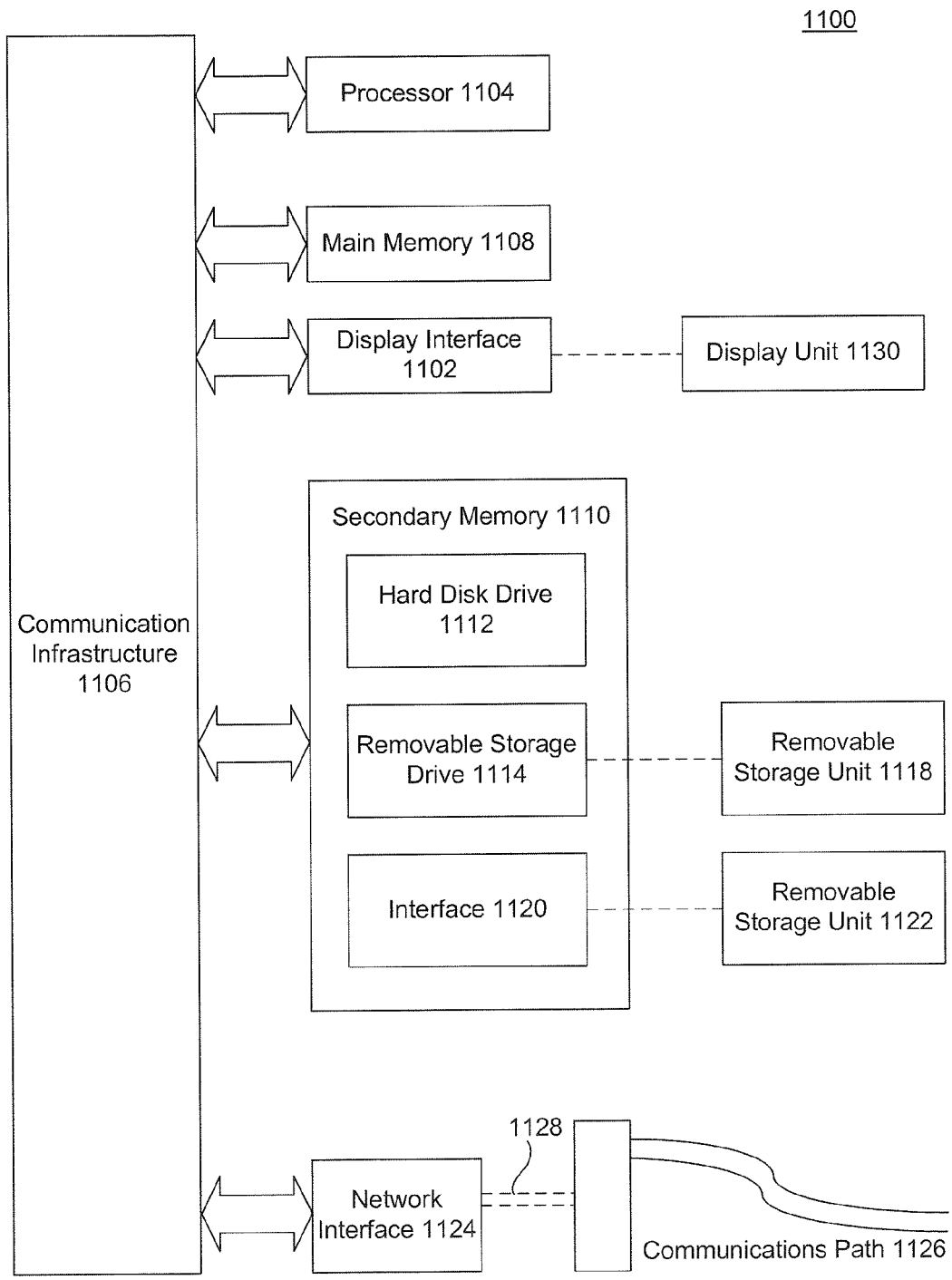
FIG. 11 depicts an example computer system in which embodiments of the present invention may be implemented.

Various aspects of the present invention can be implemented by software, firmware, hardware, or a combination thereof. FIG. 11 illustrates an example computer system 1100 in which the present invention, or portions thereof, can be implemented as computer-readable code. For example, the methods illustrated by flowcharts 200 of FIGS. 2 and 400 of FIG. 4 can be implemented in system 1100. Various embodiments of the invention are described in terms of this example computer system 1100. After reading this description, it will become apparent to a person skilled in the relevant art how to implement the invention using other computer systems and/or computer architectures.

Computer system 1100 includes one or more processors, such as processor 1104. Processor 1104 can be a special purpose or a general purpose processor. Processor 1104 is connected to a communication infrastructure 1106 (for example, a bus or network).

Computer system 1100 also includes a main memory 1108, preferably random access memory (RAM), and may also include a secondary memory 1110. Secondary memory 1110 may include, for example, a hard disk drive 1112, a removable storage drive 1114, and/or a memory stick. Removable storage drive 1114 may comprise a floppy disk drive, a magnetic tape drive, an optical disk drive, a flash memory, or the like. The removable storage drive 1114 reads from and/or writes to a removable storage unit 1118 in a well known manner. Removable storage unit 1118 may comprise a floppy disk, magnetic tape, optical disk, etc. that is read by and written to by removable storage drive 1114. As will be appreciated by persons skilled in the relevant art(s), removable storage unit 1118 includes a computer usable storage medium having stored therein computer software and/or data.

In alternative implementations, secondary memory 1110 may include other similar means for allowing computer programs or other instructions to be loaded into computer system 1100. Such means may include, for example, a removable storage unit 1122 and an interface 1120. Examples of such means may include a program cartridge and cartridge interface (such as that found in video game devices), a removable memory chip (such as an EPROM, or PROM) and associated socket, and other removable storage units 1122 and interfaces 1120 that allow software and data to be transferred from the removable storage unit 1122 to computer system 1100.

Computer system 1100 may also include a communications interface 1124. Communications interface 1124 allows software and data to be transferred between computer system 1100 and external devices. Communications interface 1124 may include a modem, a network interface (such as an Ethernet card), a communications port, a PCMCIA slot and card, or the like. Software and data transferred via communications interface 1124 are in the form of signals that may be electronic, electromagnetic, optical, or other signals capable of being received by communications interface 1124. These signals are provided to communications interface 1124 via a communications path 1126. Communications path 1126 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 1118, removable storage unit 1122, and a hard disk installed in hard disk drive 1112. Signals carried over communications path 1126 can also embody the logic described herein. Computer program medium and computer usable medium can also refer to memories, such as main memory 1108 and secondary memory 1110, which can be memory semiconductors (e.g. DRAMs, etc.). These computer program products are means for providing software to computer system 1100.

Computer programs (also called computer control logic) are stored in main memory 1108 and/or secondary memory 1110. Computer programs may also be received via communications interface 1124. Such computer programs, when executed, enable computer system 1100 to implement the present invention as discussed herein. In particular, the computer programs, when executed, enable processor 1104 to implement the processes of the present invention, such as the steps in the methods illustrated by flowcharts 200 of FIGS. 2 and 400 of FIG. 4, discussed above. Accordingly, such computer programs represent controllers of the computer system 1100. Where the invention is implemented using software, the software may be stored in a computer program product and loaded into computer system 1100 using removable storage drive 1114, interface 1120, hard drive 1112 or communications interface 1124.

The invention is also directed to computer program products comprising software stored on any computer useable medium. Such software, when executed in one or more data processing device, causes a data processing device(s) to operate as described herein. Embodiments of the invention employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.).

X. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. It should be understood that the invention is not limited to these examples. The invention is applicable to any elements operating as described herein. Accordingly, the breadth and scope of the present invention should not be limited by any of the above-described exemplary embodiments, but should be defined only in accordance with the following claims and their equivalents.

What is claimed is:

1. A method comprising:

obtaining a specification for an enterprise information system operation comprising one or more enterprise information system parameters;

identifying a mobile business object related to the enterprise information system operation, the mobile business object having one or more attributes having a different format than the one or more enterprise information system parameters;

defining a binding between the one or more attributes and the one or more enterprise information system parameters usable by the mobile business object and reusable by one or more additional mobile business objects at a client device in communication with the enterprise information system, the defining further comprising:

defining a binding for one of the one or more enterprise information system parameters to a constant value, and utilizing the constant value as a default for the one of the one or more enterprise information system parameters if an additional binding to the one of the one or more enterprise information system parameters comprises null data.

2. The method of claim 1, wherein defining the binding comprises:

defining a binding for one of the one or more enterprise information system parameters to an expression.

3. The method of claim 1, wherein defining the binding comprises:

defining a binding for one of the one or more enterprise information system parameters to a personalization parameter.

4. The method of claim 1, wherein defining the binding comprises:

defining a binding for one of the one or more enterprise information system parameters to a foreign attribute of an additional mobile business object.

5. The method of claim 1, wherein defining the binding comprises:

defining a binding for one of the one or more enterprise information system parameters to a value path, the value path comprising an attribute of the mobile business object.

6. The method of claim 1, farther comprising:

receiving a call to an operation of the mobile business object, the operation of the mobile business object corresponding to the enterprise information system operation;

preparing the one or more enterprise information system parameters for the enterprise information system operation, the one or more enterprise information system parameters determined based on the binding; and sending the one or more enterprise information system parameters to the enterprise information system.

7. A non-transitory computer-readable storage device having stored thereon computer-executable instructions, execution of which, by one or more computing devices, causes the computing devices to perform operations comprising:

obtaining a specification for an enterprise information system operation comprising one or more enterprise information system parameters;

identifying a mobile business object related to the enterprise information system operation, the mobile business object having one or more attributes having a different format than the one or more enterprise information system parameters;

defining a binding between the one or more attributes and the one or more enterprise information system parameters usable by the mobile business object and reusable by one or more additional mobile business objects at a client device in communication with the enterprise information system, the defining further comprising:

defining a binding for one of the one or more enterprise information system parameters to a constant value, and utilizing the constant value as a default for the one of the one or more enterprise information system parameters if an additional binding to the one of the one or more enterprise information system parameters comprises null data.

8. The computer-readable storage device of claim 7, wherein defining the binding comprises:
defining a binding for one of the one or more enterprise information system parameters to an expression.

9. The computer-readable storage device of claim 7, wherein defining the binding comprises:
defining a binding for one of the one or more enterprise information system parameters to a personalization parameter.

10. The computer-readable storage device of claim 7, wherein defining the binding comprises:
defining a binding for one of the one or more enterprise information system parameters to a foreign attribute of an additional mobile business object.

11. The computer-readable storage device of claim 7, wherein defining the binding comprises:
defining a binding for one of the one or more enterprise information system parameters to a value path, the value path comprising an attribute of the mobile business object.

12. The computer-readable storage device of claim 7, the operations further comprising:
receiving a call to an operation of the mobile business object, the operation of the mobile business object corresponding to the enterprise information system operation;
preparing the one or more enterprise information system parameters for the enterprise information system operation, the one or more enterprise information system parameters determined based on the binding; and
sending the one or more enterprise information system parameters to the enterprise information system.

13. A system comprising:
a memory configured to store modules comprising:
an obtaining module configured to:
obtain a specification for an enterprise information system operation comprising one or more enterprise information system parameters,
an identifying module configured to:
identify a mobile business object related to the enterprise information system operation, the mobile business object having one or more attributes having a different format than the one or more enterprise information system parameters,
a defining module configured to:
define a binding between the one or more attributes and the one or more enterprise information system parameters usable by the mobile business object and reusable by one or more additional mobile business objects at a client device in communication with the enterprise information system
define a binding for one of the one or more enterprise information system parameters to a constant value,
utilize the constant value as a default for the one of the one or more enterprise information system parameters if an additional binding to the one of the one or more enterprise information system parameters comprises null data; and
one or more processors configured to process the modules.

14. The system of claim 13, wherein the defining module is further configured to define a binding for one of the one or more enterprise information system parameters to at least one of:
an expression,
a personalization parameter,
a foreign attribute of an additional mobile business object, and
a value path, the value path comprising an attribute of the mobile business object.

15. The system of claim 14, wherein the constant value is utilized as a default for the one of the one or more enterprise information system parameters if an additional binding to the one of the one or more enterprise information system parameters comprises null data.

16. The system of claim 13, further comprising:
a receiving module configured to receive a call to an operation of the mobile business object, the operation of the mobile business object corresponding to the enterprise information system operation;
a preparing module configured to prepare the one or more enterprise information system parameters for the enterprise information system operation, the one or more enterprise information system parameters determined based on the binding; and
a sending module configured to send the one or more enterprise information system parameters to the enterprise information system.

* * * * *